No. 866,352. PATENTED SEPT. 17, 1907.
H. F. FULLAGAR & J. F. BOTTOMLEY.
INTERNAL COMBUSTION ENGINE OF THE TURBINE TYPE.
APPLICATION FILED NOV. 30, 1906.
3 SHEETS—SHEET 2.
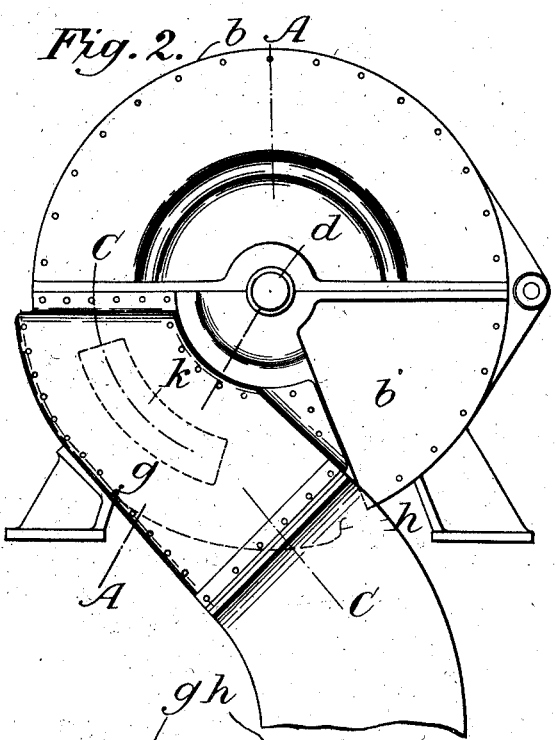
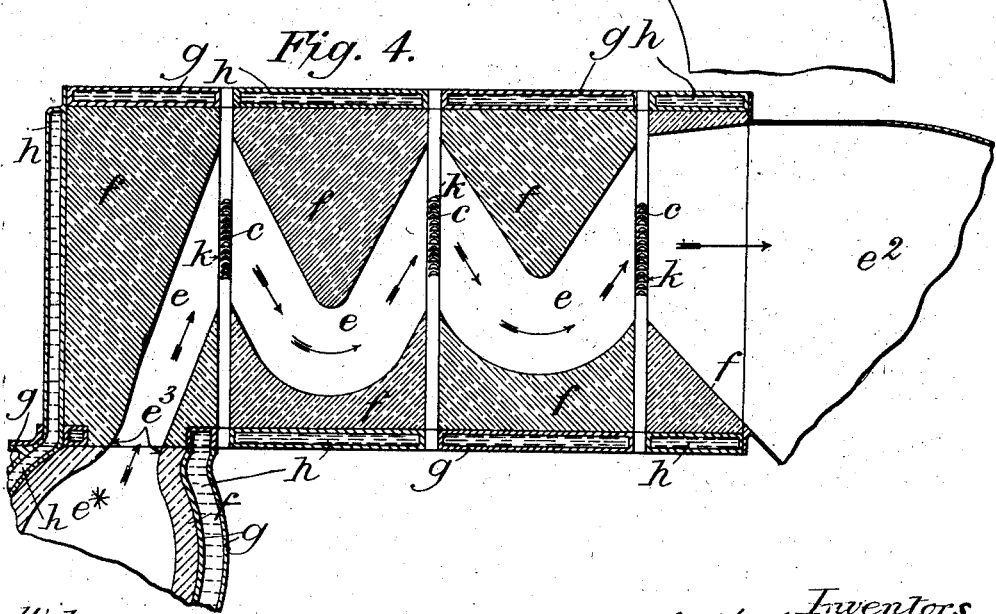

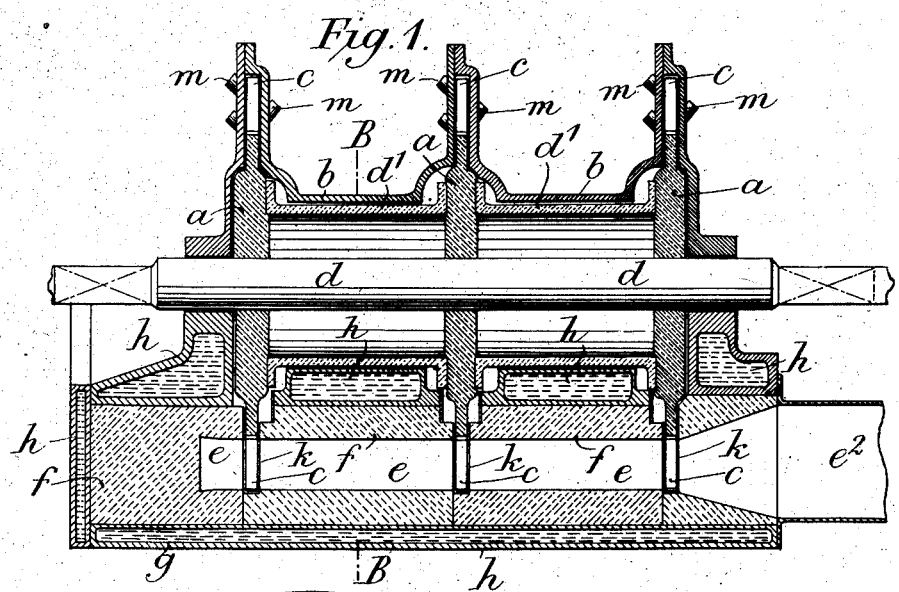
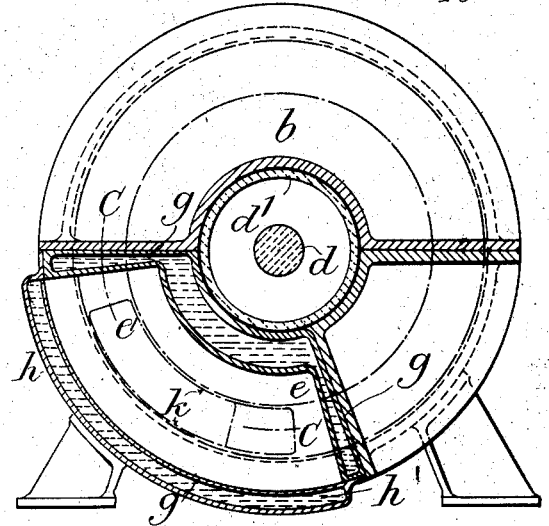

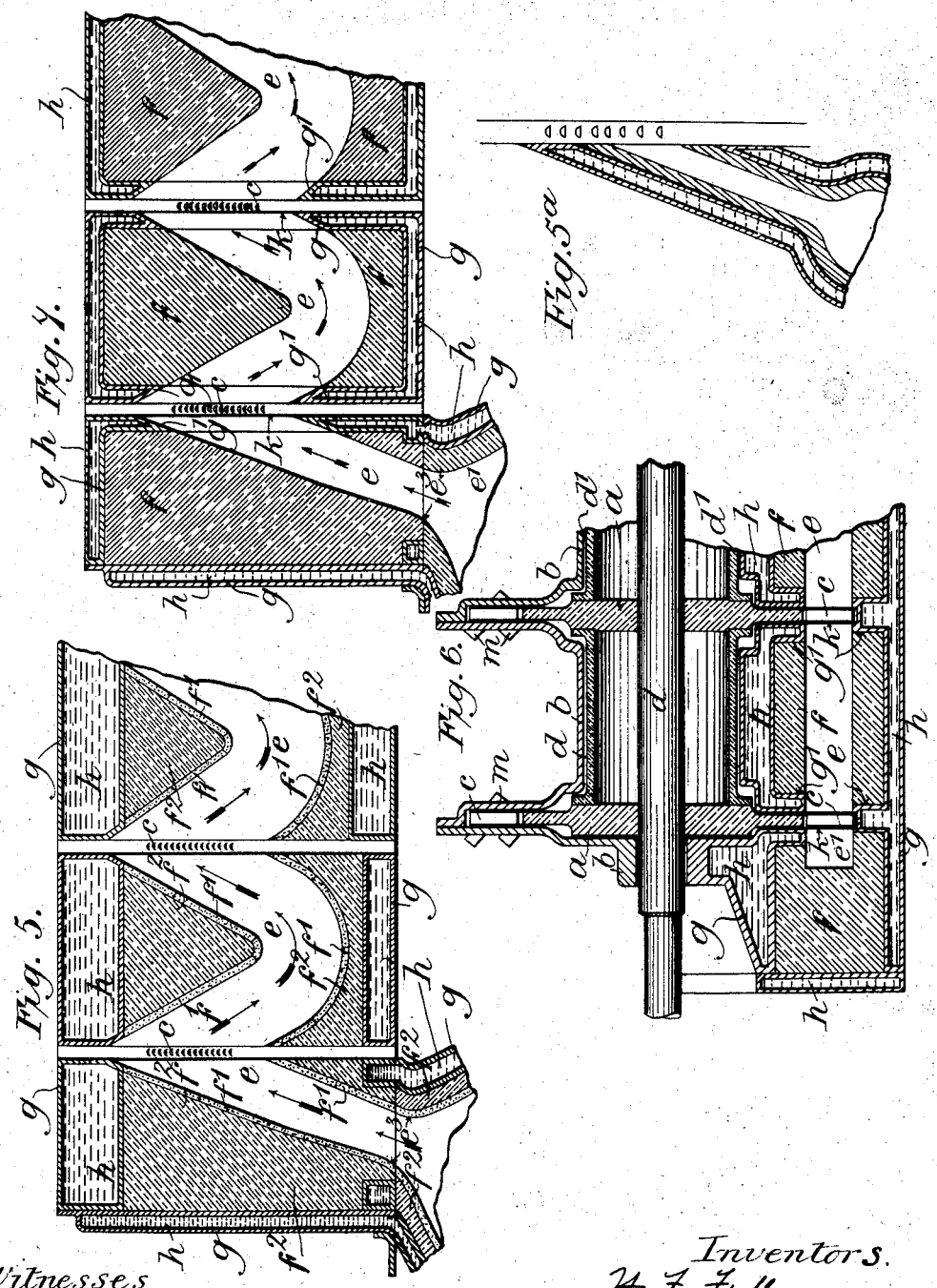

UNITED STATES PATENT OFFICE.

HUGH FRANCIS FULLAGAR AND JAMES FRANCIS BOTTOMLEY, OF NEWCASTLE-UPON-TYNE, ENGLAND.

INTERNAL-COMBUSTION ENGINE OF THE TURBINE TYPE.

No. 866,352.

Specification of Letters Patent.

Patented Sept. 17, 1907.

Application filed November 30, 1906. Serial No. 345,823.

*To all whom it may concern:*

Be it known that we, HUGH FRANCIS FULLAGAR and JAMES FRANCIS BOTTOMLEY, subjects of the King of Great Britain and Ireland, residing, respectively, at Newcastle-upon-Tyne, in the county of Northumberland, England, have invented Improvements in Internal-Combustion Engines of the Turbine Type, of which the following is a specification.

This invention relates to internal combustion engines of the type wherein the combustion products of air and fuel emerging from a chamber in which combustion takes place act upon a motor of the turbine type to produce useful work. In an engine of this type the nozzle or nozzles by which the gases enter the turbine must necessarily be exposed to a very high temperature, while the temperature along the whole path or paths of the gases throughout the turbine will almost inevitably be also very high. Great difficulty has in consequence been experienced in constructing such turbines to resist the destructive action of the gases at such high temperatures, and to prevent the corrosion and distortion of the parts, under the intense heat, causing leakage and misdirection of the gases and otherwise impairing the efficiency of the turbine.

It has already been proposed to line the parts subject to the highest temperatures with refractory materials but very great difficulties have been encountered because, as is well known, the materials suitable for the purpose are all brittle and very liable to be cracked by mechanical strain, and because, especially in large turbines, the pressure on these linings, due to the thrust of the gases, is considerable, and, owing to the large size and great length of such passages in turbines of any practicable size, for example of 1000 horse power and upwards, a small difference in the coefficients of expansion between the refractory material and the casing causes severe strain. The best refractory material for maintaining a good surface, namely, fused silica, gives rise to the greatest difficulties, as its coefficient of expansion is practically *nil*.

Moreover, though it is possible to protect the rotating rings of turbine blades (which are only intermittently subject to the hot gases) by artificially cooling them, this method is not feasible in the case of fixed blades and passages continuously exposed to the hot gases, while even if such cooling were feasible, it would be highly undesirable, owing to the serious loss of heat and consequently of efficiency, which would be entailed.

Now this invention has for its object to avoid the waste and corrosion of the surfaces exposed to the hot gases, to reduce as far as possible the area of such surfaces so as to reduce the loss of heat transmitted by them, and to prevent such heat as is unavoidably transmitted through them from reaching the casings, bearings and other parts of the turbine, and also to provide a construction in which the alinement and relative positions of the parts shall be comparatively unaffected by high temperature or wide variations of temperature, so that leakage around the rotating turbine blades shall be reduced and the efficiency of the motor maintained. For this purpose, the products of combustion on leaving the combustion chamber are led to a passage of considerable length, the linings or walls of which are formed of fused silica or other refractory non-corrosive and practically non-conducting and non-expanding material firmly held in a metal frame or casing kept cool by water jacketing or other means, so that the temperatures of the metal casing and the walls are kept approximately at temperatures inversely proportional to their coefficients of expansion, and that the products of the large coefficient of the metal by its low temperature, and of the small coefficient of the walls by their high temperature are approximately equal. In this way differences of expansion, such as would otherwise disturb the alinement and rigidity of the whole, are avoided.

The shape of the passage is preferably such that the perimeter of cross section is small compared with the cross-sectional area so that the exposed surface is thereby limited. The passage is provided at intervals with two or more transverse segmental notches or channels into which dip two or more rings of rotating turbine blades suitably held or mounted on the edges of two or more rotating disks or wheels. The passage is suitably curved throughout its length so as to direct the hot gases at the required angles in succession against the successive rings of rotating blades, and the said rings of blades are sufficiently far apart to allow this direction of the gases to be effected entirely by the curvature of the passage itself. One or more guiding stationary blades, of a similar material, may be inserted lengthwise in the passage so as to subdivide the same in width and thereby enable it to be reduced in length, but, owing to the fact that the thin edges and exposed surfaces of such blades are particularly liable to injury, the construction first mentioned is preferred.

The linings or walls of the successive portions of the passage are preferably formed of fused silica or some suitable ceramic or vitreous material shaped to the required curves and accurately fitted to the rotating rings of blades with the fine clearances desirable to prevent leakage. The linings or walls are firmly held in permanent alinement by a metal case or frame into which they are fitted, with or without a refractory non-expanding cement or packing material; in some cases the metallic frame or case may be cast around the material of the linings or walls. Such heat as would reach the casing through the refractory linings or walls is dissipated by a water jacket or other means so that the temperature of the casing is kept low and constant, and such heat as passes through the non-conducting lining is prevented from reaching the other parts of the turbine. The passage as a whole will therefore not undergo such expansion or contraction as would disturb the clearance relations between the sides of the segmental notches or channels and the rotating rings of blades.

It will be understood that the quantity of heat to be absorbed and drawn off from the casing will depend inter alia upon the thickness and conductivity of the linings or walls.

The rotating turbine blade wheels will of course be inclosed by a suitable casing, which may embrace, if desired, the case or frame of the gas passage hereinbefore described. The cooling of the latter has then the further advantage of intercepting such heat as passes through the non-conducting linings or walls and preventing it from reaching the other parts of the turbine.

It is of course understood that the cross-sectional area of the passage at each point of its length is proportioned to the desired volume and velocity of the gases at that point, having regard to their temperature, the drop of pressure to be effected, as well as the velocity to be extracted by each ring of rotating blades. Owing to the low pressure and consequent low ratio of expansion advisable in internal combustion turbines, this accurate shaping of the passage throughout the whole of its length to produce the correct velocities, is a matter of far greater importance than in the case of steam turbines where a high pressure and therefore—a high ratio of expansion is employed.

Fused silica linings or walls for the purpose of this invention may be produced by fusing quartz sand in an electric furnace according to the specification of British Letters Patent No. 10670 of 1904, or No. 18437 of 1904, and a metal casing may afterwards, if desired, be cast around such a lining after the manner described in the specification of British Letters Patent No. 21018 of 1904.

If desired, a plurality of gas passages constructed according to this invention may be combined in one turbine so as to direct hot gases on to the rotating rings of blades at more than one point simultaneously.

In the accompanying illustrative drawings, Figure 1 shows in longitudinal section on the line A A of Fig. 2, Fig. 2 in end elevation, and Fig. 3 in cross section on the line B B of Fig. 1, one construction of internal combustion engine of the turbine type embodying the present invention. Fig. 4 is a developed longitudinal section taken through the gas passage on the line C C of Figs. 2 and 3. Fig. 5 is a similar view to Fig. 4 showing a modification. Fig. 5$^a$ is a sectional view showing another modified construction. Figs. 6 and 7 are similar views to Figs. 1 and 4 respectively showing a further modification.

The engine shown in Figs. 1 to 4 inclusive is constructed with three turbine wheels $a$ mounted to rotate within a metal casing $b$ and each provided with a single ring of blades $c$, the three wheels being fixed upon a rotary shaft $d$ and connected together by tubular distance pieces $d^1$.

$e$ is a passage through which the highly heated combustion products are led from a combustion chamber (not shown) located at a lower level than the engine and caused to impinge upon the successive rings of turbine blades $c$. The said passage is formed of refractory non-corrosive and practically non-conducting and non-expanding material $f$, such as fused silica, which is firmly held within and surrounded by a metal frame or casing $g$ with the several portions of the passage $e$ in alinement with each other. The casing $g$ is provided with a water jacket $h$ through which cold water is caused to flow for the purpose of keeping its temperature low and constant so as to avoid expansion and contraction and prevent such heat as reaches it from passing to the remaining portion of the casing $b$ to which the said casing $g$ is, as shown, fixed.

$k$ are transverse segmental notches or channels cut at intervals in the material $f$ across the passage $e$ into which the rings of turbine blades $c$ extend so that the hot gases flowing through the said passage can act upon them. The passage is made of the curved form shown so as to direct the hot gases flowing through it, at the required angles against the successive rings of blades $c$ for rotating the same and the attached turbine wheels $a$.

The gas passage $e$ in the example shown, is of partly annular shape in cross section at the portions where it meets the rings of revolving blades (see Figs. 2 and 3), the cross sectional area thereof at each point of its length from its inlet end $e^1$ to its outlet end $e^2$, being, as hereinbefore stated, proportioned to the desired volume and velocity of the gases at that point, having regard to the temperature of the gases, the drop in pressure to be effected, as well as the velocity to be extracted by each rotary ring of blades $c$. For this purpose the part $e^1$ of the passage leading from the combustion chamber to the first turbine wheel $a$ is made, as shown for example at $e^*$ in Fig. 4, of a section which gradually contracts towards the portion which forms the nozzle $e^3$ by which the gases enter the turbine, after which it increases gradually and by steps as shown, towards the outlet end $e^2$ which also may advantageously be made of the flaring shape shown in Fig. 4, so as to reduce such velocity as remains in the gases after passing through the last ring of rotating blades. The proportions shown in the drawings are designed for a combustion pressure of 45 lbs. (forty five pounds) to the square inch absolute and a velocity at the first ring of rotating blades of about 3000 (three thousand) feet per second. It will be understood that for higher initial pressures, a greater ratio of expansion must be provided for.

The sides of the notches or channels $k$ are accurately fitted to the rotating rings of blades $c$ with the fine clearness desirable to prevent leakage of the gases.

Instead of making the walls of the passage $e$ wholly of fused silica or equivalent refractory material, as in the arrangement shown in Figs. 1 to 4, the said passage may, as shown in Fig. 5, be provided with linings $f^1$ of such refractory material built up of plates or bricks secured to a more workable but good refractory non-expanding material $f^2$. In this case the water jacket $h$ of the metal casing $g$ in which the material $f^2$ is fixed, may, as shown, be made thicker so as to enable a greater volume of water to flow therethrough for carrying away the heat that passes through the said material.

Fig. 5$^a$ shows the nozzle portion of the gas passage with a modified form of surrounding water jacket.

In the modified construction shown in Figs. 6 and 7, the transverse segmental notches or channels $k$ are formed in and between inwardly extending portions $g^1$ of the water jacketed casing $g$ in order more firmly to hold the walls or lining $f$ or $f^1$ and to protect the edges thereof from becoming broken off. In other respects the modified constructions shown in Figs. 5, 6 and 7 are similar to that shown in Figs. 1 to 4 inclusive.

$m$, $m$ are apertures through which a cooling fluid, for example water, can be admitted through the upper part of the casing $b$ so as to come into contact with the turbine blades as the same rotate through this part of the casing and cool them.

It will be evident that in cases where, owing to the pressures, or number of rings of blades or the methods of cooling adopted, the temperature of the gases towards the exhaust end is so low as not to require the use of a refractory lining or wall to the passage, this invention need only be applied to the passages subjected to the higher temperatures.

What we claim is:—

1. In an internal combustion engine of the turbine type, a tube or passage of refractory and practically non-conducting and non-expanding material through which highly heated products of combustion can flow at a great velocity, a metal frame or casing holding the parts of said tube or passage in correct alinement, and means for cooling said frame or casing and maintaining the co-acting parts at temperatures proportioned inversely to their co-efficients of expansion, substantially as described for the purpose set forth.

2. In an internal combustion engine of the turbine type, a tube or passage of refractory and practically non-conducting and non-expanding material open at each end and through which highly heated products of combustion can flow at a great velocity, and a frame or casing surrounding said tube or passage and having a water jacket adapted to maintain it at the required temperature relative to that of the refractory material inclosed thereby, substantially as described for the purpose set forth.

3. In an internal combustion engine of the turbine type, a tube or passage having its inner walls formed of fused silica and open at each end for the flow of highly heated gases at a great velocity therethrough, a metal frame or casing in which said tube or passage is firmly held with its parts in correct alinement, and means for carrying away such heat as reaches said frame or casing from said tube or passage.

4. In an internal combustion engine of the turbine type, a tube or passage formed of refractory and practically non-conducting and non-expanding material, the passageway therethrough being open at each end and reversely curved in the direction of its length, a metal frame or casing surrounding said tube or passage, and means for carrying away such heat as reaches said frame or casing from the tube or passage.

5. In an internal combustion engine of the turbine type, a tube or passage of refractory and practically non-conducting and non-expanding material through which highly heated products of combustion can continuously flow at a great velocity, turbine wheels extending into and across said tube or passage, and a water jacketed frame or casing surrounding the said material and arranged to support the same on the sides thereof adjacent to the sides of the wheels.

6. In an internal combustion engine of the turbine type, blocks of refractory and practically non-conducting and non-expanding material arranged near together and having a reversely curved passageway open at each end extending lengthwise therethrough for the flow of highly heated products of combustion at a great velocity, a water jacketed frame or casing surrounding said blocks and holding the same in correct alinement, and turbine wheels comprising a plurality of rotary rings of turbine blades extending transversely through said frame or casing and into said passageway.

7. In an internal combustion engine of the turbine type, blocks of refractory and practically non-conducting and non-expanding material arranged near together and having a reversely curved passageway open at each end extending lengthwise therethrough for the flow of highly heated products of combustion at a great velocity, a water jacketed frame or casing surrounding said blocks and holding the same in correct alinement, parts of said water jacketed frame or casing extending between and so as to form portions of the side walls of transverse channels between said blocks, and turbine wheels comprising a plurality of rotary rings of turbine blades extending transversely through said frame or casing and channels and across said passageway.

8. In an internal combustion engine of the turbine type, the combination with turbine wheels and a main inclosing casing of a substantially continuous tube or passage for the hot gases constructed of or lined with a refractory and practically non-expanding and non-conducting material and across which said turbine wheel extends, a frame or casing for firmly holding the parts of said material in correct alinement, and means for carrying away heat from said frame or casing and prevent it passing to the main casing and maintaining said frame or casing and tube or passage at temperatures proportioned inversely to their co-efficients of expansion.

9. In an internal combustion engine of the turbine type, the combination with a plurality of rotary rings of turbine blades, and a main inclosing casing, of a substantially continuous passage for the hot gases, said tube or passage being constructed of a refractory and practically non-corrosive non-conducting material with transversely arranged segmental channels into which the rotary rings of blades extend, and being reversely curved in the direction of its length to direct the hot gases at the required angles against the successive rings of blades, a frame or casing for firmly holding said non-conducting material in place with the successive portions of the passage in correct alinement, and means for carrying away such heat as reaches said frame or casing from the refractory material.

10. An internal combustion engine of the turbine type, comprising a plurality of rotary turbine wheels fixed upon a common shaft, a casing inclosing said turbine wheels except at one side through which said wheels project, a body of refractory non-corrosive and practically non-conducting and non-expanding material having a substantially continuous passageway extending lengthwise therethrough, and transverse segmental channels therein at intervals of its length into which said turbine wheels extend, a water jacketed metal frame or casing that surrounds and firmly holds said refractory material in place, fits into said main frame or casing, and through which said rotary turbine wheels extend into the transverse channels and across the passageway, the inlet end of said passage being made of a section that gradually contracts towards the portion which forms the nozzle by which the gases enter the turbine, and then increases in steps towards the outlet end of said passage, the intermediate portion of the passage being reversely curved in the direction of its length, substantially as described for the purpose specified.

Signed at Newcastle-on-Tyne, England, this nineteenth day of November 1906.

HUGH FRANCIS FULLAGAR.
JAMES FRANCIS BOTTOMLEY.

Witnesses:
JOHN TENNANT GRUNDY,
WILLIAM HAY.